United States Patent
Schmidt

(10) Patent No.: US 10,000,282 B2
(45) Date of Patent: Jun. 19, 2018

(54) AIRCRAFT LANDING GEAR ASSEMBLY

(71) Applicant: Safran Landing Systems UK Ltd, Gloucester (GB)

(72) Inventor: Robert Kyle Schmidt, Gloucester (GB)

(73) Assignee: Safran Landing Systems UK Ltd (GB)

( * ) Notice: Subject to any disclaimer, the term of this patent is extended or adjusted under 35 U.S.C. 154(b) by 110 days.

(21) Appl. No.: 15/156,820

(22) Filed: May 17, 2016

(65) Prior Publication Data
US 2016/0375993 A1   Dec. 29, 2016

(30) Foreign Application Priority Data
Jun. 2, 2015   (EP) .................... 15170283

(51) Int. Cl.
| | |
|---|---|
| B64C 25/10 | (2006.01) |
| B64C 25/62 | (2006.01) |
| B64C 25/34 | (2006.01) |
| B64C 25/60 | (2006.01) |
| F16F 13/00 | (2006.01) |

(52) U.S. Cl.
CPC .............. *B64C 25/62* (2013.01); *B64C 25/10* (2013.01); *B64C 25/34* (2013.01); *B64C 25/60* (2013.01); *F16F 13/007* (2013.01); *F16F 2226/04* (2013.01); *F16F 2230/0023* (2013.01)

(58) Field of Classification Search
CPC .......... B64C 25/60; B64C 25/62; B64C 25/64
See application file for complete search history.

(56) References Cited

U.S. PATENT DOCUMENTS

| | | | |
|---|---|---|---|
| 2,373,508 A | 4/1945 | Snyder | |
| 2,471,294 A | 5/1949 | Watts | |
| 2,563,194 A | 8/1951 | Shavvbrook | |
| 2,618,478 A * | 11/1952 | Conway | B64C 25/60 |
| | | | 213/43 |
| 2,724,590 A | 11/1955 | Irwin | |
| 3,011,778 A | 12/1961 | Yntema | |
| 3,389,903 A | 6/1968 | Schmid | |
| 3,544,043 A | 12/1970 | Stratford | |
| 3,696,894 A | 10/1972 | Brady | |
| 4,524,929 A | 6/1985 | Gebhard | |
| 4,623,049 A | 11/1986 | Warren | |
| 5,927,646 A * | 7/1999 | Sandy | B64C 25/52 |
| | | | 188/377 |

(Continued)

FOREIGN PATENT DOCUMENTS

| | | |
|---|---|---|
| DE | 102013112818 | 5/2015 |
| GB | 348667 | 5/1931 |

(Continued)

OTHER PUBLICATIONS

European Search Report dated Nov. 19, 2015 for European Application No. 15170283.4, 9 pages.

*Primary Examiner* — Richard G Davis
(74) *Attorney, Agent, or Firm* — RatnerPrestia

(57) ABSTRACT

An aircraft landing gear assembly includes a mechanical structural linkage having a shock absorber and a linkage abutment which are biased apart by a mechanical spring. The force required to deform the spring sufficiently to place the linkage abutment at a predefined distance with respect to the shock absorber abutment is less than the breakout force of the shock absorber.

19 Claims, 4 Drawing Sheets

(56) References Cited

U.S. PATENT DOCUMENTS

| | | |
|---|---|---|
| 9,377,077 B2 | 6/2016 | Fitterling |
| 2002/0163111 A1 | 11/2002 | Voelkel |
| 2009/0050736 A1 | 2/2009 | Bennett |
| 2010/0219290 A1 | 9/2010 | Luce |
| 2012/0211600 A1 | 8/2012 | Mellor |
| 2015/0292586 A1 | 10/2015 | Li |

FOREIGN PATENT DOCUMENTS

| | | |
|---|---|---|
| GB | 452324 | 8/1936 |
| GB | 460361 | 1/1937 |
| GB | 585231 | 2/1947 |
| GB | 668543 | 3/1952 |
| GB | 709080 | 5/1954 |
| GB | 712903 | 8/1954 |
| GB | 881718 | 11/1961 |
| GB | 351896 | 7/1981 |
| WO | 2014059767 | 4/2014 |

\* cited by examiner

AIRCRAFT LANDING GEAR ASSEMBLY

This Application claims priority to and the benefit of European Application 15170283.4, filed on Jun. 2, 2015, which is incorporated herein by reference in its entirety.

BACKGROUND TO THE INVENTION

Aircraft on-board control systems typically require a 'weight on wheels' or 'weight off wheels' signal (each of which will be referred to as a 'WoW' signal) to be detected before allowing an operator to perform certain landing-specific functions, such as deploying lift dumping devices and applying landing gear brakes.

It is known to use mechanical closure of the main shock absorbing strut to provide a WoW signal; for example, a sensor such as a proximity sensor can be switched on when a main shock absorbing strut attains a predetermined state of compression. Such sensors will be referred to herein as compression-based WoW sensors.

The design of aircraft landing gear shock absorbers is often a compromise between shock absorber simplicity and the need to balance the weight, stroke, internal pressure, and the initial 'breakout' force required to start the shock absorber compressing.

Shock absorber breakout force can be described as the sum of the gas pressure multiplied by the effective area of the shock absorber in addition to any friction effects in the shock absorber system. Increasing the effective area of a shock absorber or increasing its inflation pressure has the effect of directly increasing its breakout force. While the breakout force does not adversely affect normal operation of the shock absorber, it can adversely affect the shock absorber's ability to close rapidly during light landings, where the aircraft landing force acting on the shock absorber is below average.

The present inventor has identified that known aircraft landing gear assembly compression-based WoW sensors can be made more reliable, simplified in design and/or reduced in size and/or weight.

SUMMARY OF INVENTION

According to a first aspect of the invention there is provided an aircraft landing gear assembly comprising:
  a mounting coupling via which the landing gear assembly is arranged to be coupled to an aircraft;
  a wheel assembly coupling arranged to be coupled to a wheel assembly;
  a structural linkage mechanically coupling the mounting coupling to the wheel coupling so as to define a load path between the mounting coupling and the wheel coupling capable of reacting aircraft load upon landing, the structural linkage comprising:
    a shock absorber, which can contain shock absorber fluid, including an external shock absorber abutment;
    a mechanical spring; and
    a linkage abutment movably coupled with respect to the shock absorber abutment by the mechanical spring, the mechanical spring being arranged to bias the structural linkage to assume a default extended state in which the linkage abutment is spaced from the shock absorber abutment, the spring being compressible such that the linkage abutment can be moved into contact with the linkage abutment,
  wherein the mechanical spring is configured such that the force required to deform the spring sufficiently to place the linkage abutment at a predefined distance with respect to the shock absorber abutment, is less than the breakout force of the shock absorber.

Thus, the landing gear assembly according to the first aspect defines a structural linkage which acts as a dual stage shock absorber in which the main stage is a conventional shock absorber and the second stage is a non-pneumatic, mechanical spring designed for short deflections only and which directly permits measurement of the initial compression of the structural linkage for WoW purposes. When the mechanical spring is sufficiently compressed, the linkage abutment contacts the shock absorber abutment such that the shock absorber can absorb landing load in a conventional manner. The landing gear assembly according to the first aspect therefore provides an elegant solution to the problem of how to facilitate a compression-based WoW sensor, which can be simpler in design and of reduced size and/or weight in comparison to known compression-based WoW sensors. The fact that the linkage abutment and mechanical spring are distinct external parts with respect to the shock absorber also enables the invention to be implemented using a conventional shock absorber.

The linkage abutment can be mounted in a fixed spatial relationship with respect to one of the mounting coupling and wheel assembly coupling.

The assembly can further comprise a compression-based WoW sensor arranged to detect when the structural linkage has been compressed sufficiently to place the linkage abutment at a predefined distance with respect to the shock absorber abutment. For example, a proximity sensor can be placed in one of the linkage abutment and shock absorber abutment.

The predefined distance can be at least half the distance between the shock absorber abutment and the linkage abutment when structural linkage is in the default extended state. The predefined distance can equate to the linkage abutment being in contact with the shock absorber abutment.

The mechanical spring can be coupled in series with the shock absorber. This can provide for a simple arrangement with a small envelope.

The shock absorber can be rigidly mounted with respect to the other one of the mounting coupling and wheel assembly i.e. the one to which the linkage abutment is not rigidly mounted with respect to.

The shock absorber abutment can be an end region of the shock absorber. This facilitates a simple 'end to end' contact arrangement between the abutments. In other case, the linkage abutment can be arranged to move along the side of the shock absorber into contact with a shock absorber abutment flange on the side of, say, the main fitting.

The assembly can comprise a variable length support coupled between the linkage abutment and the shock absorber abutment arranged to permit axial separation but inhibit lateral movement between them. This can provide lateral stiffness to support linkage.

The variable length support can comprise a hollow main casing slidably coupled in a telescopic manner to a sliding tube, which can be hollow, to define an inner space of variable size, the main casing being attached to or defining the mounting coupling and the sliding tube being attached to or defining the wheel assembly coupling, wherein the linkage abutment, spring and at least some of the shock absorber are provided within the internal space and wherein one of the linkage abutment and shock absorber is attached to the main casing and the other one of the linkage abutment and shock absorber is attached to or defines the sliding tube. Thus, the variable length support can be a conventional 'capsule' type main strut in which the shock absorber is an independent module located within the internal space.

The aircraft coupling can be arranged to be movably coupled to the aircraft to be movable between a deployed condition for take-off and landing and a stowed condition for flight.

According to a second aspect of the invention, there is provided an aircraft including one or more landing gear according to the first aspect.

According to a third aspect of the invention, there is provided a method of manufacturing a shock absorber assembly comprising the steps of:

providing a mounting coupling via which the landing gear assembly is arranged to be coupled to an aircraft;

providing a wheel assembly coupling arranged to be coupled to a wheel assembly;

mechanically coupling a structural linkage to the mounting coupling and to the wheel coupling so as to define a mechanical load path between the mounting coupling and the wheel coupling capable of reacting aircraft load upon landing, whereby the structural linkage comprises:
a conventional shock absorber having a shock absorber abutment;
a mechanical spring; and
a linkage abutment, the linkage abutment being rigidly mounted with respect to one of the mounting coupling and wheel assembly coupling and being movably coupled with respect to the shock absorber abutment by the mechanical spring, the mechanical spring being arranged to bias the structural linkage to assume a default extended state in which the linkage abutment is spaced from the shock absorber abutment, the spring being compressible such that the linkage abutment can be moved relative to the shock absorber abutment to be brought into contact with it,
wherein the mechanical spring is configured such that the force required to deform the spring sufficiently to place the linkage abutment at a predefined distance with respect to the shock absorber abutment, is less than the breakout force of the shock absorber.

Optional features of the first aspect can be applied to the method of the third aspect in an analogous fashion.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
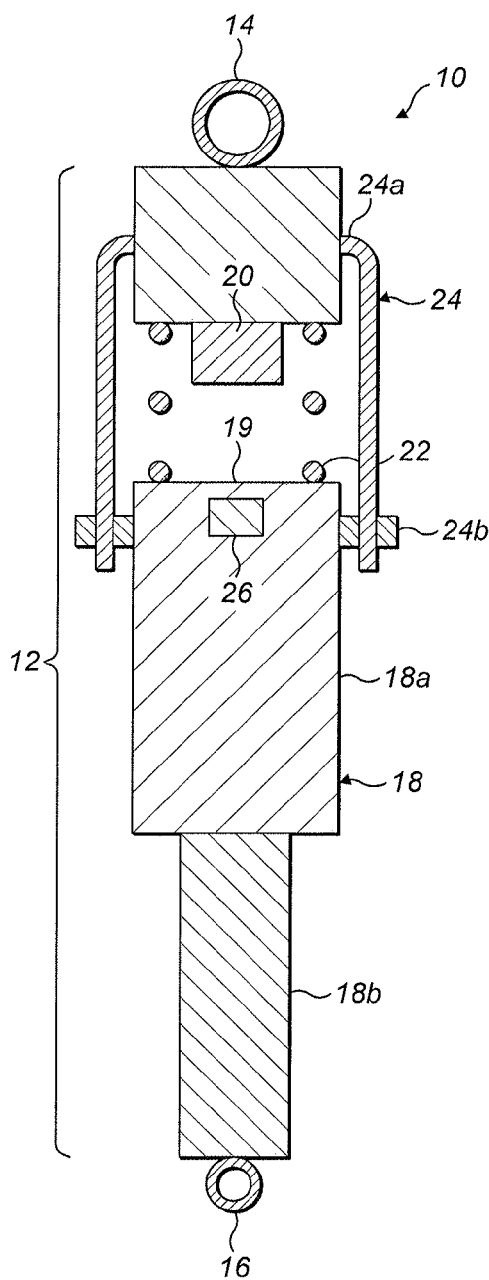
FIG. 1 is a schematic diagram of a shock absorber assembly according to embodiment of the present invention.

FIG. 1 shows a diagram of shock absorber assembly 10 according to an embodiment of the present invention. The shock absorber assembly 10 is arranged to form part of an aircraft assembly such as a landing gear assembly (not shown). For example, the shock absorber assembly 10 can define the main landing gear strut in a main landing gear assembly.

The shock absorber assembly 10 includes a mounting coupling 14 by which the shock absorber assembly 10 is arranged to be movably coupled to an aircraft not shown so as to be moveable between a deployed position for take-off and landing, and a stowing condition for flight. However, in other embodiments the shock absorber assembly can be arranged to form part of a fixed landing gear.

A structural linkage 12 exists between the mounting coupling 14 and the wheel assembly coupling 16. The structural linkage 12 defines a mechanical load path between the mounting coupling 14 and the wheel assembly coupling 16 capable of reacting aircraft load upon landing. The main elements of the structural linkage 12 are a conventional shock absorber 18, such as an oleo-pneumatic shock absorber, a linkage abutment 20 and a mechanical coil spring 22.

The mounting coupling 14 is attached to, or forms part of, a structure defining the linkage abutment 20. Thus, the linkage abutment 20 is rigidly mounted with respect to the mounting coupling 14.

The shock absorber 18 includes an upper housing portion 18 within which a lower housing portion or slider 18b is telescopically mounted. An upper end region 19 of the upper housing portion 18a defines a shock absorber abutment 19 arranged to be brought into engagement with the linkage abutment 20. A lower end of the lower housing portion 18b is attached to the wheel assembly coupling 16. Thus, the lower portion 18b of the shock absorber 18 is rigidly mounted with respect to the mounting coupling 14, but in other embodiments this need not be the case. The wheel assembly coupling 16 is arranged to be coupled to a wheel assembly, such as a bogie beam carrying axles with wheel and brake assemblies provided thereon, or any other conventional type of wheel assembly. The term 'wheel assembly' in intended to cover any assembly arranged to act as an interface between the landing gear assembly and the ground in use; for example a skid or the like.

A mechanical spring 22 is provided in series between the shock absorber 18 and the linkage abutment 20 so as to bias the linkage abutment 20 to assume a position which is spaced from the shock absorber abutment 19. The mechanical spring 22 is therefore arranged to bias the structural linkage 12 to assume a default extended state in which the linkage abutment 20 is spaced from the shock absorber abutment 19, the spring 22 being compressible such that the linkage abutment 20 can be moved relative to the shock absorber abutment 19 to be brought into contact with it.

The mechanical spring 22 is configured such that the force required to deform the spring 22 sufficiently to place the linkage abutment 20 at a predefined distance with respect to the shock absorber abutment 19, is less than the breakout force of the shock absorber 18.

A proximity sensor 26 is mounted at or adjacent to the shock absorber abutment 19 and is arranged to detect that the linkage abutment 20 has assumed a predetermined position relative to the shock absorber abutment 19. Thus, the shock absorber assembly 10 can be utilised as compression based WoW sensor, the proximity sensor 26 detecting when the mechanical spring 20 has been compressed sufficiently to be indicative of aircraft WoW.

Figure 2:
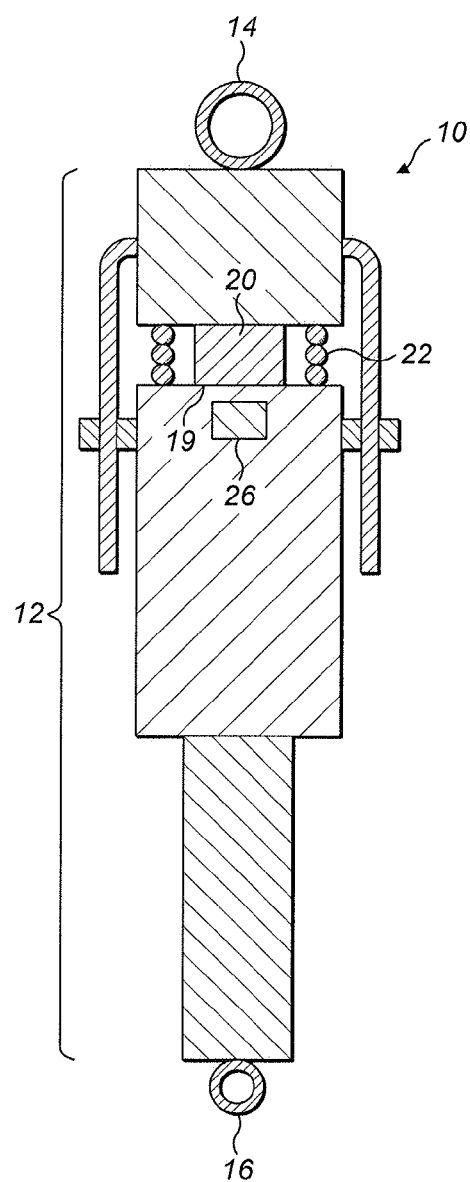
FIG. 2 is a schematic diagram of the shock absorber assembly of FIG. 2 in a relatively compressed state.

Referring additionally to FIG. 2, following a pre-determined amount of spring compression the linkage abutment 20 contacts the shock absorber abutment 19 of the main fitting 18a such that the shock absorber 18 can absorb continued landing load in a conventional manner.

In the illustrated embodiment, the linkage abutment 20 is a protrusion which is generally aligned with the longitudinal axis of the shock absorber 18, as this facilitates a simple 'end to end' contact arrangement between the abutments 20, 19. However, in other embodiments, the abutments can take any suitable form; for example, the linkage abutment can be arranged to move along the side of the shock absorber into contact with a shock absorber abutment flange on the side of, say, the main fitting.

In the illustrated embodiment, the structural linkage 12 also includes a variable length support 24 which in this example includes rods 24a which extend from the structure defining the linkage abutment 20 and are received within guide holes of a stabilising flange 24b that extends radially from the main fitting 18a. Thus, the variable length support 24 maintains the linkage abutment 20 in axial alignment with the shock absorber 18 while permitting the linkage abutment 20 to be moved towards and away from the shock absorber 18 against the bias of the spring 22.

Figure 3:
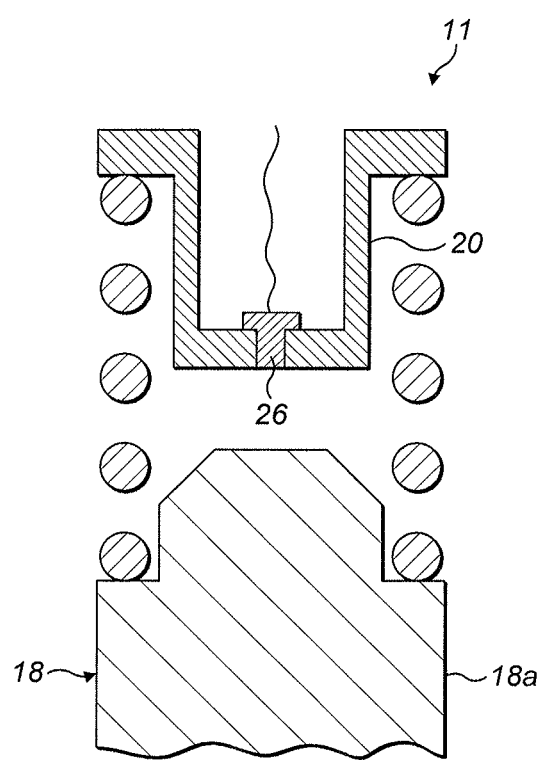
FIG. 3 is a partial view of a shock absorber assembly according to a further embodiment of the present invention.

Referring to FIG. 3, a shock absorber assembly according to a further embodiment is shown generally at 11, in which the proximity sensor 26 is mounted in the linkage abutment 20 rather than the upper portion 18a of the shock absorber 18.

Figure 4:
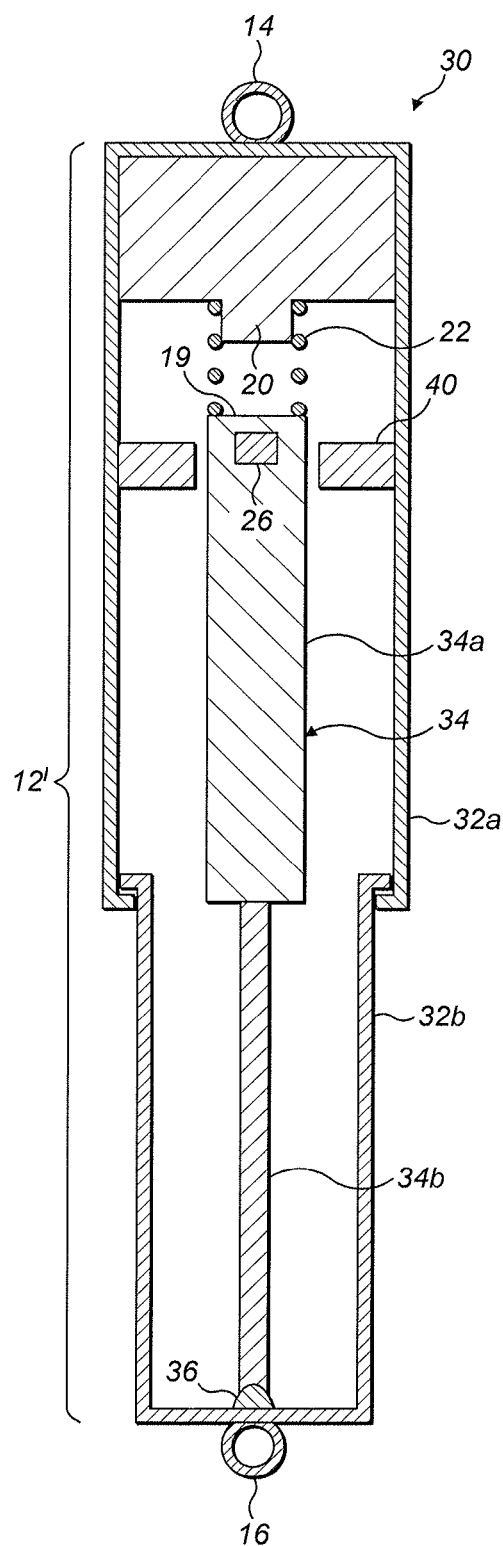
FIG. 4 is a partial view of a shock absorber assembly according to a further embodiment of the present invention.

FIG. 4 shows an alternative embodiment in which the shock absorber assembly 30 includes a capsule-type shock absorber 34. As with the earlier described embodiments, the assembly 30 includes a mounting coupling 14 and a wheel assembly coupling 16 with a structural linkage 12' defining a mechanical load path between them. The structural linkage 12' includes a spring 22 and a linkage abutment 20 analogous to those described above.

However, in the illustrated embodiment, the structural linkage 12' includes a hollow telescopic casing 32 including an upper casing portion 32a slidably mounted with respect to an inner, lower casing portion 32b and capsule type shock absorber 34 provided within the casing. As will be appreciated by the skilled person, a capsule type shock absorber includes an outer casing for structural rigidity and an inner shock absorber which serves to dampen axial loads applied to the casing. The outer casing therefore serves as a variable length support. An upper end region of the capsule shock absorber 34 is provided with a proximity switch 26'. The linkage abutment 20 is mounted to or defined by the top inner surface of outer casing 32a in registration with the longitudinal axis of the shock absorber 34. The spring 22 is provided between the linkage abutment 20 and shock absorber 34 to bias them apart. Compression of the outer casing 32 due to landing loads compresses the spring 22 to bring the linkage abutment 20 into contact with the shock absorber 34, following which the shock absorber 34 can act in a conventional manner to absorb landing loads.

Figure 5:
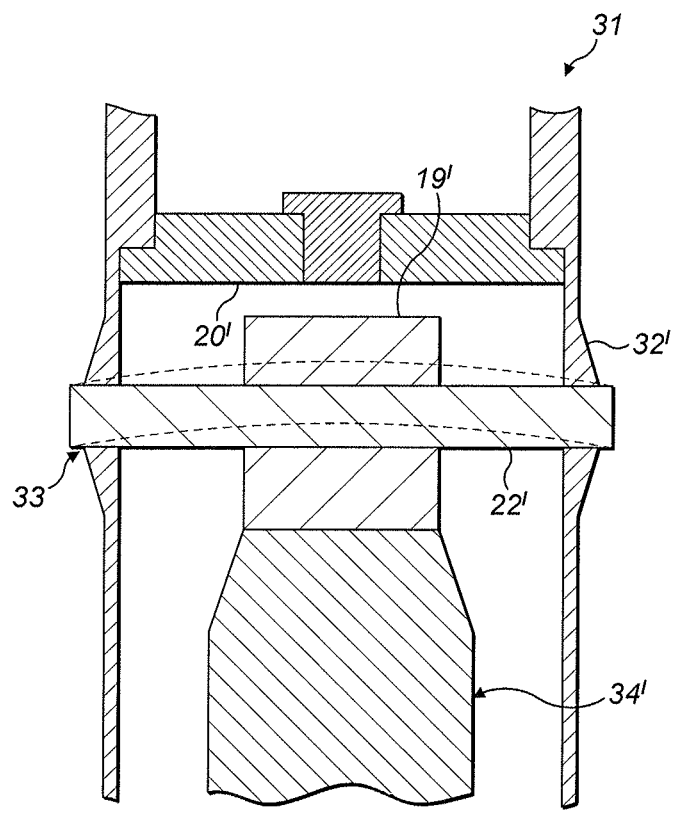
FIG. 5 is a schematic cross section diagram of a shock absorber assembly according to a further embodiment of the present invention.

Although in the above mentioned embodiments the spring 22 as a coil spring, in other embodiments the spring can take any suitable form. For example, as shown in FIG. 5, the shock absorber assembly 31 can include a leaf spring 22' which extends laterally through an upper portion of the shock absorber 34' and is mounted within holes 33 provided through the outer casing 32'. As such, landing loads causes the leaf spring 22'' to flex, as shown in broken lines, until the linkage abutment 20 contacts the shock absorber abutment 19, following which the shock absorber can be compressed.

It will be appreciated that one of the linkage abutment and shock absorber abutment can be defined by a generally flat axial surface, with the other being defined by a projection which can be brought into contact with the generally flat axial surface.

Figure 6:
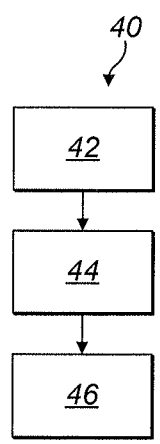
FIG. 6 is a diagram of a method of manufacturing a shock absorber assembly according to an embodiment of the invention.

Referring to FIG. 6, a method of manufacturing a shock absorber assembly according to an embodiment of the invention is shown generally at 40.

Step 42 involves providing a mounting coupling via which a landing gear assembly is arranged to be coupled to an aircraft. The coupling can be arranged to be movably coupled to an aircraft to be movable between a deployed condition for take-off and landing and a stowed condition for flight.

Step 44 involves providing a wheel assembly coupling arranged to be coupled to a wheel assembly.

Step 46 involves mechanically coupling a structural linkage as described with reference to an earlier embodiment to the mounting coupling and to the wheel coupling so as to define a mechanical load path between them.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
    a mounting coupling via which the landing gear assembly is arranged to be coupled to an aircraft;
    a wheel assembly coupling arranged to be coupled to a wheel assembly;
    a structural linkage mechanically coupling the mounting coupling to the wheel coupling, the structural linkage comprising:
        a shock absorber having a breakout force and including an external shock absorber abutment,
        a mechanical spring, and
        a linkage abutment, movably coupled with respect to the shock absorber abutment by the mechanical spring, the mechanical spring being arranged to bias the structural linkage to assume a default extended state in which the linkage abutment is spaced from the shock absorber abutment, the spring being compressible such that the linkage abutment can be moved into contact with the shock absorber abutment,
        wherein the mechanical spring is configured such that the force required to deform the spring sufficiently to place the linkage abutment at a predefined distance with respect to the shock absorber abutment, is less than the breakout force of the shock absorber.

2. The aircraft landing gear assembly according to claim 1, further comprising a compression-based WoW sensor arranged to detect when the structural linkage has been compressed sufficiently to place the linkage abutment at a predefined distance with respect to the shock absorber abutment.

3. The aircraft landing gear assembly according to claim 2, wherein the compression-based WoW sensor comprises a proximity sensor mounted in or on one of the linkage abutment and shock absorber abutment.

4. The aircraft landing gear assembly according to claim 2, wherein the predefined distance is at least half the distance between the shock absorber abutment and the linkage abutment when structural linkage is in the default extended state.

5. The aircraft landing gear assembly according to claim 1, wherein the mechanical spring is coupled in series with the shock absorber.

6. The aircraft landing gear assembly according to claim 1, wherein the shock absorber is rigidly mounted with respect to the other one of the mounting coupling and wheel assembly.

7. The aircraft landing gear assembly according to claim 1, wherein the shock absorber abutment is defined by an end region of the shock absorber closest to the linkage abutment.

8. The aircraft landing gear assembly according to claim 1, further comprising a variable length support coupled between the linkage abutment and the shock absorber abutment arranged to permit axial separation but inhibit lateral movement between the linkage abutment and the shock absorber abutment.

9. The aircraft landing gear assembly according to claim 8, wherein the variable length support comprises a hollow main casing slidably coupled in a telescopic manner to a sliding tube to define an inner space of variable size, the main casing being attached to or defining the mounting coupling and the sliding tube being attached to or defining the wheel assembly coupling, wherein the linkage abutment, spring and at least some of the shock absorber are provided within the internal space and wherein one of the linkage abutment and shock absorber is attached to the main casing and the other one of the linkage abutment and shock absorber is attached to or defines the sliding tube.

10. The aircraft landing gear assembly according to claim 9, wherein the sliding tube is hollow.

11. The aircraft landing gear assembly according to claim 1, further comprising a wheel assembly coupled to the wheel assembly coupling.

12. The aircraft landing gear assembly according to claim 1, wherein the aircraft coupling is movably coupled to the aircraft so as to be movable between a deployed condition for take-off and landing and a stowed condition for flight.

13. The aircraft landing gear assembly according to claim 1, wherein the shock absorber is arranged to absorb loads applied between the shock absorber abutment and linkage abutment.

14. The aircraft landing gear assembly according to claim 1, wherein the shock absorber is a main landing gear strut shock absorber.

15. The aircraft landing gear assembly according to claim 1, wherein the shock absorber is a hydraulic, pneumatic or oleo-pneumatic shock absorber.

16. An aircraft including one or more landing gear assemblies, each aircraft landing gear assembly comprising:

a mounting coupling via which the landing gear assembly is arranged to be coupled to an aircraft;
a wheel assembly coupling arranged to be coupled to a wheel assembly; and
a structural linkage mechanically coupling the mounting coupling to the wheel coupling, the structural linkage comprising:
  a shock absorber having a breakout force and including an external shock absorber abutment,
  a mechanical spring, and
  a linkage abutment, movably coupled with respect to the shock absorber abutment by the mechanical spring, the mechanical spring being arranged to bias the structural linkage to assume a default extended state in which the linkage abutment is spaced from the shock absorber abutment, the spring being compressible such that the linkage abutment can be moved into contact with the shock absorber abutment,
  wherein the mechanical spring is configured such that the force required to deform the spring sufficiently to place the linkage abutment at a predefined distance with respect to the shock absorber abutment, is less than the breakout force of the shock absorber.

17. A method of manufacturing a shock absorber assembly comprising the steps of:
providing a mounting coupling via which the landing gear assembly is arranged to be coupled to an aircraft;
providing a wheel assembly coupling arranged to be coupled to a wheel assembly;
mechanically coupling a structural linkage to the at least one of the mounting coupling and to the wheel coupling so as to define a mechanical load path between the mounting coupling and the wheel coupling capable of reacting aircraft load upon landing, whereby the structural linkage comprises:
  a shock absorber having a breakout force and a shock absorber abutment,
  a mechanical spring, and
  a linkage abutment movably coupled with respect to the shock absorber abutment by the mechanical spring, the mechanical spring being arranged to bias the structural linkage to assume a default extended state in which the linkage abutment is spaced from the shock absorber abutment, the spring being compressible such that the linkage abutment can be moved relative to the shock absorber abutment to be brought into contact with it,
  wherein the mechanical spring is configured such that the force required to deform the spring sufficiently to place the linkage abutment at a predefined distance with respect to the shock absorber abutment, is less than the breakout force of the shock absorber.

18. The method according to claim 17, whereby the structural linkage includes a variable length support arranged to maintain the linkage abutment and shock absorber abutment in axial alignment.

19. The method according to claim 18, whereby the shock absorber and variable length support are defined by a capsule-type shock absorber.

* * * * *